United States Patent
Moreels et al.

(10) Patent No.: US 12,214,362 B2
(45) Date of Patent: Feb. 4, 2025

(54) PROCESS OF RECYCLING A BITUMINOUS WASTE PRODUCT SUCH AS A WASTE BITUMINOUS MEMBRANE PRODUCT

(71) Applicant: IMPERBEL, Bergensesteenweg (BE)

(72) Inventors: Guillaume Moreels, Bergensesteenweg (BE); Julien Dormal, Bergensesteenweg (BE); Caroline Martin, Bergensesteenweg (BE); Koen Sneiders, Bergensesteenweg (BE); Patrick Cogneau, Bergensesteenweg (BE)

(73) Assignee: Imperbel, Beersel (BE)

( * ) Notice: Subject to any disclaimer, the term of this patent is extended or adjusted under 35 U.S.C. 154(b) by 231 days.

(21) Appl. No.: 17/776,077

(22) PCT Filed: Nov. 27, 2020

(86) PCT No.: PCT/EP2020/083766
§ 371 (c)(1),
(2) Date: May 11, 2022

(87) PCT Pub. No.: WO2021/105451
PCT Pub. Date: Jun. 3, 2021

(65) Prior Publication Data
US 2022/0388010 A1    Dec. 8, 2022

(30) Foreign Application Priority Data

Nov. 29, 2019   (WO) .................. PCT/EP2019/083184

(51) Int. Cl.
*B03B 9/06*    (2006.01)
*B02C 18/00*   (2006.01)
(Continued)

(52) U.S. Cl.
CPC .......... *B03B 9/061* (2013.01); *B02C 18/0084* (2013.01); *B02C 18/06* (2013.01);
(Continued)

(58) Field of Classification Search
CPC ...... B03B 9/061; C08L 95/00; C08L 2555/34; C10C 3/007; C08J 2395/00; C08J 11/06
See application file for complete search history.

(56) References Cited

U.S. PATENT DOCUMENTS 4,726,846 A * 2/1988 Jackson .................. C10C 3/007
                                                     521/45.5
7,891,590 B2 * 2/2011 Rasmussen ......... B02C 18/2241
                                                     241/73

(Continued)

FOREIGN PATENT DOCUMENTS

DE    4128014 A1 *  2/1993   ........... B29B 13/022
EP    1813360 A2 *  8/2007   ............. B03B 9/065

OTHER PUBLICATIONS

International Search Report, European Patent Office, Feb. 18, 2021.
(Continued)

*Primary Examiner* — Jared O Brown
(74) *Attorney, Agent, or Firm* — Harness, Dickey & Pierce, P.L.C.

(57) ABSTRACT

A process of recycling a bituminous product or a bituminous membrane product contacting reinforcement layers. Collecting the waste bituminous products and sorting it in a series of waste bituminous product batches. At least one grinding step of each batch in each series forms a fine ground batch. The fine ground batch is introduced into a recycling unit wherein the fine ground batch is heated and melted and collected as a melted product. The melted product is fed into a mixing tank having a predetermined volume containing fresh carrier.

5 Claims, 9 Drawing Sheets

(51) Int. Cl.
  *B02C 18/06* (2006.01)
  *B02C 19/00* (2006.01)
  *B02C 23/08* (2006.01)
  *B02C 23/38* (2006.01)
  *C08L 95/00* (2006.01)
  *C10C 3/00* (2006.01)
  *B02C 23/14* (2006.01)

(52) U.S. Cl.
  CPC .......... *B02C 19/0056* (2013.01); *B02C 23/08* (2013.01); *B02C 23/38* (2013.01); *C08L 95/00* (2013.01); *C10C 3/007* (2013.01); *B02C 23/14* (2013.01); *C08L 2555/34* (2013.01); *Y02W 30/52* (2015.05)

(56) References Cited

U.S. PATENT DOCUMENTS

| | | | |
|---|---|---|---|
| 9,574,137 B2 * | 2/2017 | Pochert | B30B 9/262 |
| 2005/0263625 A1 * | 12/2005 | Macaluso | B02C 4/40 241/30 |

OTHER PUBLICATIONS

Written Opinion of the International Search Report, European Patent Office, Feb. 18, 2021.

* cited by examiner

PROCESS OF RECYCLING A BITUMINOUS WASTE PRODUCT SUCH AS A WASTE BITUMINOUS MEMBRANE PRODUCT

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/EP2020/083766 filed on Nov. 27, 2020, and which in turn claims priority under 35 USC 119 to International Application No. PCT/EP2019/083184 filed on Nov. 29, 2019.

The present invention relates to a process for recycling a bituminous waste product such as for example a bituminous waste membrane product having at least a bituminous layer and optionally at least one reinforcement layer in a recycling unit comprising a first rotor housed in a first stator, and a chamber delimited by an external wall of the first rotor and also relates to a recycling plant as well as to bituminous products.

Bitumen is a very complex material which can be obtained by different kind of processes treating crude oil. Depending on the origin of crude oil and on the process applied, several kinds of bitumen can be obtained with different properties in terms of viscosity, penetrability, shelf life and softening point. For example, a bitumen produced by a crude oil coming from Venezuela, Middle East or Mexico will have different physical properties, which also depend on the kind of process applied for producing the bitumen.

Generally, bitumen is produced during the refining of crude oil. The refining of crude oil comprises two steps. The first step consists to realize an atmospheric distillation in a first fractionating column to produce mainly liquefied petroleum gas, gasoline and kerosene. The second step consists in realizing a distillation under vacuum in a second column for producing gasoil and distillates. The bottom fraction recovered at the output of the second column can be processed according to a deasphalting process or by distillation to separate the lubricants from the bitumen. The deasphalting process corresponds to a physical separation of the remaining components of crude oil by using solvents. Indeed, this step is based on the different solubility of the remaining components of crude oil. Depending on the kind of solvent used (butane or propane), for realizing said separation step, the obtained bitumen will have different physical properties. On the opposite, the distillation of the obtained bottom fraction consists in cracking the crude oil to obtain bitumen on one hand and lubricants on the other hand.

For these reasons, the bitumen will have properties which will depend on the origin of crude oil and on the process applied to produce it.

When bitumen is produced according to the aforementioned process comprising the first and second distillation steps, it has a crystalline structure corresponding to a sol. A bitumen having a sol structure, recovered as a bottom fraction in the fractioned column under vacuum, can be convert into a gel structure by applying an oxidation process, or air blowing. The latter consists to pass air through the heated bitumen to raise an appropriate viscosity of the bitumen. This process produces a bitumen with a maintained flexibility when it is used, at an ambient temperature. When the bitumen is processed by air blowing, its viscosity is modified and the equilibrium mentioned above is therefore different. More precisely, the sum of the proportions of the saturated oils and asphaltenes are greater to the one of the aromatic oils and resins. The colloidal structure is therefore a gel structure where the amount of asphaltenes in the bitumen is doubled with respect to the initial quantity of asphaltenes in the sol structure.

A bitumen can also be modified by mixing it with a polymer to form a modified bitumen. In this process, the bitumen is preferably a bitumen with a sol structure. The addition of a polymer to bitumen will lead to a phase inversion when the amount of the polymer will be sufficient to obtain the phase inversion corresponding to the formation of a polymeric matrix wherein bitumen is retained. When the inversion phase occurs, the bitumen having the behavior of a Newtonian liquid will have the properties of a viscoelastic fluid.

The polymer and the bitumen have particular chemical interactions. The polymer forms a continuous phase (polymeric matrix) and the bitumen forms a dispersed phase. When the phase inversion occurs, the bitumen is retained into the polymeric matrix giving the adequate viscoelastic properties and the stability to the composition comprising the bitumen and the polymer. Such a modified bitumen can be used for manufacturing a waterproofing membrane having an appropriate flexibility which is an advantageous criteria, for example when the waterproofing membrane is applied on a roof. The phase inversion phenomenon depends on the ratios of the polymer and the bitumen in the composition.

Two main categories of modified bitumen exist today for forming roof-membranes. Either the bitumen is modified with SBS (Styrene-butadiene-styrene) and form a SBS-modified bitumen or the bitumen is modified with APP (atactic polypropylene) and form APP-modified bitumen.

The modified bitumen will have different properties depending on the category of its modifying polymer but also thanks to any additives supplemented to the bitumen composition. Back to the two main categories of bitumen, the modification of bitumen through SBS or APP allows manufacturers to create a longer-lasting, more durable product—giving it either plastic (APP) or rubber properties (SBS). Modifying bitumen gives it the ability to withstand a wide temperature range, and superior weather proofing.

For instance APP-modified bitumen begins to melt at about 130°-150° C., it melts into a liquid wax like substance which acts as an almost free-flowing liquid which can then be mopped across a surface allowing an easy torch-application. SBS-modified bitumen is a sticky melt which is more flexible when compared to the plastic used in APP.

Sometimes, SBS-modified bitumen roofing membrane are provided with slate glitter or gravels, sand and their mixture.

Another kind of bitumen also exists where the bitumen for waterproofing membrane is produced with vegetal oil, like crude tall oil pitch or modified tall oil pitch.

Consequently, the origin of the bitumen, the nature of the polymer or the nature of the oil residue, the manufacturing method to produce the bitumen and the subsequent treatment of the bitumen, creates a broad range of bitumen membranes with different nature and diversified composition with production waste that need to be recycled.

Nowadays, a major part of flat roofs are covered by bituminous waterproofing or watertight membrane which are delivered onsite in rolls. The bituminous membranes usually are applied to the roof by torching or hot air welding or subjected to a cold application of the waterproofing or watertight membrane by self-adhesive, glue or by mechanic fixing means.

During the production of waterproofing or watertight bituminous membranes, at least one reinforcement is fed and is covered by bitumen on both sides and sometimes finally surfaced with mineral granules, flakes, sand and/or thin foils.

The reinforcement can be made by a reinforcement structure which is typically flat and thin of a material chosen in the group comprising polyester nonwoven, glass grid or fleece, combination reinforcements (glass and polyester), metal foils (e.g. copper, aluminium)) and their combination.

A recycling unit for bituminous products is known from the U.S. Pat. No. 4,185,784. In the known unit, the material to be recycled is introduced into the recycling unit provided with heating means. The material to be recycled thus melts under the effect of the heat and friction with the rotor of the unit. The rotation of the rotor disintegrates the reinforcements present in the material to be recycled so that the product thus obtained is recyclable. The known unit comprises a chamber that is arranged in the wall of the stator so that the width of this chamber is reduced from the input thus causing a funnel effect that pushes the material towards the rotor.

However, this known recycling unit and method are not entirely appropriate for recycling bituminous products such as membranes provided with at least one reinforcement layer, which comprises fibers. The fibers are difficult to destroy completely yielding to masses of fibers remaining in the product resulting from the recycling method and prevent this product being used, as a raw material, for the manufacture of new membranes. Further, the non-cylindrical construction of the stator imposes a fairly complex technique for manufacturing the stator.

Another recycling unit has been disclosed in EP1534434 which includes a micronization chamber formed by a recess arranged in a counter-element mounted on the stator which is substantially cylindrical. The micronization chamber comprises an adjustment means organized to adjust the volume and/or shape of the chamber and in that at least one scraper organized to scrape the external wall of the rotor is mounted downstream of the micronization chamber, which scraper extends over at least part of the length of the first rotor and has a stepped profile having at least a first and a second step, the first step, which is situated close to an output of the recycling unit, being disposed closest to the external wall of the first rotor.

Subjecting the pieces to micronization succeeds in disintegrating the reinforcement present in the membrane pieces. The bituminous binder contained in the pieces can thus be melted which makes it possible to recover it more easily and obtain a recycled material allowing an increased use, in particular as a raw material. The presence of the scraper makes it possible to clean the wall of the rotor and ensures that the recycled bitumen is guided out of the grinder. The stepped profile of the scraper makes it possible to make a distinction between the sufficiently triturated material which is then discharged through the output and the insufficiently triturated material which is not discharged and thus continues to be processed.

This recycling process and unit has proven its efficiency in recycling production waste, which waste are quite clean waste products and for a restricted number of source of bituminous products, thereby needing a quite simple recycling process.

Nowadays, in the context of circular economy, there is a demand to recycle more and more waste products containing bituminous products, not only clean production waste, but also used roofing products which contain contaminated and degraded, aged bitumen and reinforcement parts. There is further a need to obtain a recycled bituminous product which can be widely used.

However, for implementing efficiently recycling processes, many constraints are present. This means that the process should be fluent, properly optimized and enough robust to manage the broad diversity and composition of the products to be recycled.

Indeed, a more complex waste products can't be treated in the recycling unit according to document EP1534434 as such. When roofing waste products are collected, those are used products having degraded bituminous layer (aged) and sometimes degraded reinforcement layers. Those used products contain many contaminating products such as metallic element and elastomer products such as EPDM (ethylene-propylen-dien-monomers) or oxidized bitumen. Further, the recycling unit as described in this document is not enough robust to manage the broad diversity of waste bituminous products and is to be repaired very frequently. For example, contaminating products creates a pressure increase in the micronization chamber and a degradation of the several joints therefore creating leakage of bituminous products, resulting in fouling and dirt build-up around the roller bearing of the rotor element and vibration of the recycling unit. In particular, this leads to the requirement to stop frequently the recycling unit for undergoing maintenance and replacement of roller bearing, being expensive wearing pieces. Due to the frequent stop, the recycling unit do not allow to carry out efficiently recycling bituminous products.

Of course, in the context of circular economy, while the intention to provide a lower impact on the environment is clearly the incentive, there is also a need to be industrially viable. This means that the process is to be stable and robust while offering enough profitability to the industrial plant.

The present invention encounters to solve at least a part of these drawbacks by providing a process for recycling a broad diversity of waste products containing bituminous products and optionally reinforcement layers, including, without being limited thereto, bituminous membrane production waste, bituminous membrane cutting waste, roofing waste products collected from demolition worksite having many different composition and contamination; which is efficient and optimized to ensure enough profitability to the industrial player, while requiring a lower maintenance and at least less frequent maintenance operations and providing a recycled bituminous product usable in a large variety of new bituminous final products.

To solve this problem, it is provided according to the present invention, a process of recycling a bituminous product optionally containing reinforcement layers comprising the steps of:

Collecting waste bituminous products preferably waste bituminous products, preferably waste bituminous membrane products containing bituminous layers and reinforcement layers and sorting the waste bituminous products in a series of n waste bituminous product batch(es), At least one grinding step of each batch of said series of n waste bituminous product batch(es) or a mixture of n waste bituminous product batch(es), thereby forming a fine ground batch, Introducing said fine ground batch into a recycling unit having at least a rotor and a stator and an micronization chamber, said fine ground batch being heated and melted by shear strength upon the operation of the stator, rotor and micronization chamber and collecting a melted product, characterized in that said process further comprises a step of feeding said melted product in a mixing tank having a predetermined volume containing fresh carrier at a level comprised between 25 and 75 w %, preferably between 30 and 60 w % with respect to the predetermined volume, at a residence temperature comprised between 160 and 200° C., preferably between 170 and 190° C., more preferably around 180° C., said mixing tank being continuously agitated with horizontal or vertical screw having mixing blades, said melted product being fed in said mixing tank until the volume of the melted product is comprised between 25 and 75%, preferably between 40 and 70 w % with respect to the predetermined volume to provide a recycled bitumen having a predefined viscosity at 180° C. for pumpability comprised between 500 and 45000 centipoise(cPS).

Within the meaning of the present invention, each grinding step provides a material reduced in pieces as a result of grinding. Each piece has dimensions characterizing the size of the pieces, called herein particle size. Accordingly, piece, particle, or grain can be used throughout this patent application interchangeably.

For the purposes of this invention, the term "mean particle size distribution" represents a diameter in relation to which 50% of the measured particles or grains are smaller or equal to.

It has been indeed realized that the present invention allows to recycle the broad diversity of production waste of bituminous membrane while also being able to recycle used bituminous membrane but also watertight membrane residues in a robust and efficient process, but also where the production $CO_2$ footprint is reduced with respect to the production of a virgin bitumen thereby providing a recycled bitumen that can be introduced back to the production process, for example of bituminous membrane with a high ratio, such as with more than 25%, preferably more than 30%, more preferably more than 50% of the bitumen is a recycled bitumen, while being also possible to use a drastically lower amount if wished. Indeed, in some case, the recycled bituminous product obtained by the process according to the present invention can be diluted with other carrier substances before being used in a final bituminous product.

As it can be see, the process according to the present invention comprises a dilution step of the melted product in fresh carrier, which avoid to store the melted product in buckets and having to cool them for reheating them further.

Thanks to this dilution step, the recycled bitumen can be pumped and filtered in line or even used immediately depending on its purity or can be stored in storage tanks having heating means to keep the temperature substantially constant to keep it under a pumpable form.

Thanks to the present invention, the recycled bitumen is stored in heated and agitated storage tank for immediate use and do not have to undergo mandatorily further purification steps.

Further, the recycled bitumen already comprises a portion of polymer originating from the waste product which does not prevent the bitumen product to be stored over time and does not interfere with further process, while reducing the consumption of polymer needed to realize the phase inversion in the further process when the recycled bitumen is used.

Further, the viscosity due to the dilution step has been optimized to allow the pumping and filtration in a fluent way, but also without causing any problems when mixed with other fresh carrier in subsequent production step of bitumen product such as waterproofing membranes or watertight membranes.

Further, it has been shown that despite the presence of polymer in the existing and used bituminous membrane, the presence of the polymer does not prevent the bituminous product (melted product) to be used back in the production of bituminous membrane, in the contrary, it has been shown that it allows to advantageously reduce polymer consumption during the manufacturing process, due to the fact that a significant portion is already present in the waste product. Indeed, generally, when using modified bitumen for producing waterproofing membrane, a polymer is added to the bitumen to reach the phase inversion. For an APP-modified bitumen, the level of polymer with respect to the amount of bitumen is typically comprised between 12 and 25 w %. For a SBS-modified bitumen, the level of polymer with respect to the amount of bitumen is comprised between 2 and 20 w %, typically between 4 and 12 w %.

The process according to the present invention allows to produce a recycled bitumen, containing already an amount of polymer, meaning that the amount to be added to reach the phase inversion is reduced, and sometimes drastically up to less than 50% of the normal required amount. It should be indeed noted that when a melted product is obtained by the process according to the present invention, this melted product can contain even more polymer than the amount required for reaching the phase inversion, which is not a problem, and even an advantage because when preparing modified bitumen, the substance being the most expensive one is not the bitumen, but the polymer. Accordingly, even if the amount of polymer carried by the recycled bitumen represent a higher ratio than the final ratio needed between the polymer and the bitumen, the polymer will be then diluted in the mixture with fresh carrier or another carrier in order to reduce the ratio between polymer and bitumen (or bitumen+carrier).

By recycling existing roof product, the polymer used in the manufacture of the membrane can play again its role in the bitumen inversion of phase, Finally, the quality of the bitumen obtained by the process according to the present invention is high enough to be reintroduced in a bituminous membrane at a level as high as more than 50 weight % or 75% even 100% with respect to the total bitumen weight in the final product.

The process according to the present invention therefore allows efficient way to produce recycled bituminous waste product that can be used again in a production process for bituminous membrane.

In addition, the process according to the present invention is very robust. The grinding and sorting steps upstream entering the recycling unit allows a continuous recycling of bituminous waste product despite the variety of origin, age and impurities and with a positive energetic balance with respect to fresh carrier production which is even more kept positive thanks to the fact that the maintenance is reduced and hence restarting(and reheating) steps of the recycling unit.

Advantageously, according to the present invention, said at least one grinding step comprises:
  A first grinding of each batch of said series of n waste bituminous product batch(es) in a knife shredder for reducing the size of said each batch in a first shredded batch having a mean particle size distribution comprised between 20 and 50 cm, preferably between 20 and 40 cm,
  A second grinding of each first shredded batch in a rotor granulator where each first shredded batch is reduced in size to a first crushed batch having a mean particle size distribution between 5 and 25 cm, preferably between 8 and 20 cm, A third grinding of each first crushed batch in a rotor granulator where each first crushed batch is reduced in size to a first ground batch having a mean particle size distribution between 20 and 50 mm, preferably between 25 and 40 mm, more preferably between 27 and 35 mm.

According to the present invention the at least one grinding step comprises a sequence of 3 specific grinding steps allowing to feed the recycling unit with a fine ground batch having a mean particle size distribution between 20 and 50 mm, preferably between 25 and 40 mm, more preferably between 27 and 35 mm, which is continuously fed at high feed rate and allowing to continuously produce efficiently a recycled bitumen at a constant frequency.

The process according to the present invention provides a good balance of not too small particles and not too big particles, yielding to optimal shear stress on the particles for recovering bitumen, thereby ensuring the right temperature inside the recycling unit.

Indeed, when the shear stress inside the recycling unit is too high, this create abnormal wearing and can create hot spots degrading the quality of the bitumen, when too small particles are provided to the recycling unit, the insufficient shear stress may impact negatively the temperature in the recycling unit.

It has been made possible according to the present invention to select the right size of particles entering the recycling unit, where temperature can be easily controlled and not requiring many heating additions, thereby reducing drastically the $CO_2$ footprint of the process.

Further, by the combined effect of providing a sorting step for sorting the waste bituminous products in a series of n waste bituminous product batch(es) and the selection of the subsequent grinding steps, the temperature inside the recycling unit is more easy to control, but also a huge diversity of existing roof can be recycled, together with production and cutting waste can be recycled, meaning that the process can manage waste product being at one side diversified, but also quite dirty.

Preferably, before being fed to said recycling unit, said fine ground batch is conveyed on a vibrating sieve to collect a fine ground batch substantially depleted from dust and particles having a particle size d100 lower than 8 mm, further contributing to feed the recycling unit with a fine ground fraction, depleted in dusts continuously at high feed rate and allowing to continuously produce efficiently a recycled bitumen at a constant frequency.

Preferably, according to the present invention, before being fed to said recycling unit, said fine ground batch undergoes a step of separating metal pieces from non-metal pieces by application of Foucault current to said fine ground batch and collecting a fine ground batch substantially depleted from metal pieces.

In a preferred embodiment, the said fine ground batch of said series of n waste bituminous product batch(es) is stored in at least one tank.

In a variant embodiment of the process according to the present invention, each series of n waste bituminous product batch(es) is stored under the form its said fine ground batch in a tank, thereby providing n tank of waste bituminous product, containing each a waste bituminous product.

Advantageously, in the process according to the present invention, said step of introducing at least one grinding batch into a recycling unit is a step of introducing a mixture of x ground batch(es), where x is an integer comprised between 1 and n and preferably being 1, 2 or 3.

It has been indeed observed according to the present invention that the process can handle quite homogeneous waste product or diversified waste products. Depending on the collected waste, different situations are possible such as:

a) pure production waste product with a single type of membrane product is collected (for example because there was a problem in the production line and default is present on the roofing membrane).

b) pure bituminous waste product from a construction site with a single type is collected (for example after a big project).

c) the collect brought on the recycling site waste membrane product from a demolition site which is contaminated with residues from the demolition site and the membranes are aged and degraded.

d) the collect brought on the recycling site at the same time waste membrane product from a), b) and/or c).

In practice, the waste membrane product will be sorted inn batch(es) for example SBS-modified membranes will be separated from APP-modified membranes and each will be sorted by kind of waste product such as production waste, cutting waste from construction site and waste membrane products from demolition site and will be grinded separately and stored in a tank. A mixture will then be prepared with specific ratio of each origin waste membrane product before entering the recycling unit.

Some examples of mixtures depending on the availability of the source of the product are shown in table 1:

TABLE J

| | Recycled bitumen no 1 | Recycled bitumen no 2 | Recycled bitumen no 3 | Recycled bitumen no 4 | Recycled bitumen no 5 |
|---|---|---|---|---|---|
| Production waste APP membrane products | From 50 to 55 w % | | From 60 to 70 w % | | 100 w % |
| Cutting waste APP membrane products | From 15 to 40 w % | | | | |
| Demolition site waste APP membrane products | From 35 to 5 w % | | From 30 to 40 w % | | |
| Production waste SBS membrane products | | 100 w % | | 50 w % | |
| Cutting waste SBS membrane products | | | | 40 w % | |
| Demolition site waste SBS membrane products | | | | 10 w % | |

It is indeed preferable in the process according to the invention to control the amount of demolition site waste membrane products and have the ratio preferably not exceeding comprised between 10 and 100%. On the other hand, sometimes, depending on the membrane to be produced with the recycled bitumen, it can be desirable to adapt the proportion between the several batches in the mixture to be introduced in the recycling unit.

In a preferred embodiment, the recycled bitumen fraction is further withdrawn by pumping in batch(es) and filtrated in a bag filter, optionally before or after being stored in a storage tank, at a temperature preferably comprised between 170 and 190° C.

In one advantageous embodiment of the process according to the present invention, said fine ground batch is melted at a temperature comprised between 110 and 260° C.

In yet another preferred embodiment of the process according to the present invention, said melted product overflowing along the driving axis of the recycling unit is collected in a vessel by flowing through a space provided between the stator and a coupling element provided to couple the rotor of the recycling unit and a motor.

Preferably, according to the present invention, said melted product overflowing along the driving axis is collected in a vessel by flowing through a space provided between the stator and an end of a rotation axis at a side opposite to a side connected to the motor.

By building the space provided between the stator and the coupling element and/or between the stator and an end of a rotation axis, the melted product can escape in a vessel when overflowing along the driving axis when the tightening is degraded or when more drastic conditions are happening inside the recycling unit causing high pressure point. This avoid to degrade the roller bearing and having to undertake expensive and extensive maintenance action and allow the process according to the present invention to be more robust and be pursued for a longer time between two normal maintenance operations. It was indeed surprisingly observed that despite the very high strength and very high shear stress applied inside the recycling unit, it was possible to discard the rotor/stator couple and the motor and have a longer driving axis without distorting the rotation of the rotor inside the stator.

Other embodiments of the process according to the present invention are mentioned in the appended claims.

The present invention also relates to a recycling plant for recycling a waste bituminous products preferably waste bituminous products preferably waste bituminous membrane products containing reinforcement material, comprising:
  (i) at least one grinding means provided to grind a waste bituminous product batch or a mixture of n waste bituminous product batch(es) thereby forming a fine ground batch,
  (ii) at least one recycling unit comprising a feeding means, provided to receive said fine ground batch, a first rotor housed in a first stator, provided with a chamber delimited by an external wall of the first rotor, wherein the chamber is a micronization chamber formed by a recess arranged in at least one counter-element mounted on the stator which is substantially cylindrical, which micronization chamber comprises an adjustment means organized to adjust the volume and/or shape of the chamber, and wherein at least one scraper organized to scrape the external wall of the rotor is mounted downstream of the micronization chamber, said recycling unit comprising at least an output provided to exit a melted product having passed trough said micronization chamber,
  (iii) a mixing tank in fluid communication with one output of one recycling unit, located below the exit of the recycling unit and having a predetermined volume, and comprising at least a first horizontal screw with mixing blades, provided to agitate a recycled bitumen fraction contained in said mixing tank, said recycled bitumen fraction comprising a portion of fresh carrier comprised between 25 and 75%, preferably between 30 and 60 w % with respect to the total weight of bitumen and a portion of recycled bitumen comprised between 25 and 75%, preferably between 40 and 70 w % with respect to the total weight of said bitumen, said recycled bitumen having a predefined viscosity at 180° C. for pumpability comprised between 500 and 45000 cPS.

Advantageously according to the present invention, in the recycling plant, said mixing tank is provided with a first zone and a second zone, said first zone being above said second zone, said second zone being a bottom zone, said mixing tank having a second horizontal screw with conveying baffles inside said bottom zone, said at least first horizontal screw with mixing blades being provided inside said first zone, said second horizontal screw with conveying baffles being provided to empty the residues and the bitumen product accumulated and having sedimented in said bottom zone while said at least first horizontal screw with mixing blades being provided to agitate said bituminous product located in the first zone, each first zone and second zone being provided with an exit equipped with a valve, eventually connected to a pump.

In a preferred embodiment of the recycling plant according to the present invention, at least a bag filter is connected to the exit of the first zone of the mixing tank.

In another preferred embodiment of the recycling plant according to the present invention, said at least one grinding means comprises:
  (i) a first grinding means, such as a knife shredder provided for grinding at least one batch of said series of n waste bituminous product batch(es) in a first shredded batch having a mean particle size distribution comprised between 20 and 50 cm, preferably between 20 and 40 cm, said first grinding means having a first inlet and a first exit,
  (ii) a second grinding means such as a rotor granulator, provided for grinding at least one first shredded batch in a first crushed batch having a mean particle size distribution between 5 and 25 cm, preferably between 8 and 20 cm, said second grinding means having a second inlet and a second exit, said second inlet being connected to said first exit at least by conveying means,
  (iii) a third grinding means, such as a rotor granulator provided for grinding at least first crushed batch in a first ground batch having a mean particle size distribution between 20 and 50 mm, preferably between 25 and 40 mm, more preferably between 27 and 35 mm, said third grinding means having a third inlet and a third exit, said third inlet being connect to said second exit at least by conveying means.

Preferably, the recycling plant according to the invention further comprises a vibrating sieve provided to convey and sieve the fine ground batch and to provide the fine ground batch substantially depleted from dust and particles having a particle size $d_{100}$ lower than 8 mm, preferably lower than 7 mm, more preferably less than 6 mm.

Advantageously, the recycling plan further comprises a separator provided for separating metal pieces from non-metal pieces by application of Foucault current to said fine ground batch and for producing a fine ground batch substantially depleted from metal pieces.

In a preferred embodiment, said micronization chamber formed by a recess is arranged in a cleat block between two counter-elements mounted on the stator.

In another preferred embodiment, the recycling unit comprises comprising a second micronization chamber or cavity delimited by an external wall of the first rotor, said cavity being formed in a recess arranged in a cleat block between two counter elements, said counter elements and the two cleat block being made solidar one to each other and connected to a support element comprising adjustment means organized to adjust the volume and/or shape of the chamber and move the cleat blocks along the counter elements.

Advantageously, according to the present invention, wherein the external wall of the rotor has a grooved profile to drive the recycled product and guide it towards the micronization chamber, thereby improving the efficiency of the unit.

Preferably, in the recycling plant according to the present invention, said at least one scrapper extends over at least part of the length of the first rotor and has a stepped profile having at least a first and a second step, the first step, which is situated close to an output of the recycling unit, being disposed closest to the external wall of the first rotor.

In a further preferred embodiment, wherein the counter element comprises a first knife blade mounted on a first supporting element so as to make it possible to adjust its distance with respect to the external wall of the rotor and a second knife blade mounted on a second supporting element so as to make it possible to adjust its distance with respect to the external wall of the rotor, said first and second supporting element being fixedly connected to a solidarization element allowing to adjust the distance of both the first and second supporting element together with respect to the external wall of the rotor.

The first and second knife blade are organized, preferably downstream of the chamber, to disintegrate the reinforcement and to increase its disintegration, but also to pulverize the flakes and granules provided on the surface of bituminous membrane as mineral covers.

In yet a further preferred embodiment according to the present invention, the rotor is operated by a motor driving a rotation axis connected by a tight connection to the rotor, said motor being coupled to the rotation axis by a coupling element, said rotation axis passing through a roller bearing block disposed between the tight connection and the coupling element, said tight connection and said roller bearing block being separated by a distance d comprised between 6 and 20 cm, preferably between 7.5 cm and 15 cm.

It has been indeed realized according to the present invention that, contrarily to what is generally applied in mechanical engineering that providing a significant space between the tight connection and the roller bearing block allow to increase the efficiently of the recycling plant according to the present invention, by reducing the off period and thereby increasing drastically the operating life of the plant between two maintenance.

The space provided between the tight connection and the roller bearing block allows hot bitumen overflowing from the rotor along the rotation axis to flow downwards, and hereby prevent the roller bearing getting dirt and contaminated by recycled bitumen, which latter would be very detrimental to its lifetime.

In a further advantageous embodiment according to the present invention, the rotor is on one end connect to a motor driving a rotation axis and on the other end connected to a dead end of said rotation axis by a tight connection to the rotor, said rotation axis dead end passing through a roller bearing block disposed between the tight connection and the end of the rotation axis, said tight connection and said roller bearing block being separated by a distance e comprised between 6 and 20 cm, preferably between 7.5 cm and 15 cm.

In an advantageous embodiment, said tight connection comprising a O-ring cord surrounding a metal ring located around said rotation axis, said O-ring cord extending over a length of said rotation axis defined between 2 flanges.

In a further preferred embodiment, in said tight connections, at least one the 2 flanges comprises one mobile flange provided to move along a direction parallel to the rotation axis, for example with a tightening clamp.

According to a preferred embodiment according to the present invention, downstream of the micronization chamber, a deflector is disposed in an output opening of the recycling unit, said deflector being disposed along part of the external wall of the rotor, to keep the recycled material in contact with the rotor for longer and thus lubricate the latter with the recycled material. Moreover, the presence of the deflector downstream of the micronization chamber and the fact that this deflector makes it possible to keep material against the rotor has the additional advantage of extinguishing, in the recycled material, any sparks which might have been created during the grinding of the mineral covering.

Preferably the counter-element and/or the stator are treated with a wear-resistant substance, in particular tungsten carbide. This makes the material of which the stator and the cylindrical body are manufactured more resistant to abrasion and protects them better against the impact of the mineral covering.

Preferably the recycling plant comprises an input opening and an output opening, disposed along the same axis that is offset with respect to a vertical central axis of the rotor. A suction effect is thus created on the material by the actual rotation of the rotor. This allows a better passage of the material in the recycling unit.

In a further preferred embodiment of the present invention, the recycling plant comprises a second recycling unit provided with a second rotor housed in a second stator provided with an interchangeable micronization chamber, which second stator and rotor are mounted downstream of the first stator and rotor. The presence of two rotors placed in series allows the grinding to be carried out in two stages. Thus the pulverization of the flakes and granules will take place in successive granulometric phases if the size of the micronization chamber in the second stator in comparison with that in the first stator is smaller.

Another embodiment of a plant according to the invention includes first and second stators that have a central input and the other a lateral input, the stator having the central input has an output situated at one end of the rotor, with each of the rotors there is associated one of said scrapers, the scraper associated with the rotor situated in the stator having its output at the end of the rotor is disposed so that the scraping is carried out at said end, and the scraper associated with the rotor whose stator has a lateral input is disposed at the center of the rotor with which it is associated. The capacity of the two rotors and the two stators is thus used to the maximum.

Preferably at least one of the scrapers is mounted on a pivot organized to make the scraper pivot between a first position where the scraper scrapes along the rotor, a second position where the scraper closes off.

In a further advantageous embodiment of the process according to the present invention, at least one end of the rotor is equipped with an Archimedes screw oriented in the reverse direction to that along which the material to be recycled circulates.

Preferably, the recycling plant according to the present invention comprises:

a first storage zone to store a series of waste bituminous products containing bituminous layers and optionally reinforcement layers A first mixing zone provided for mixing the series of waste bituminous products to provide a first mixture of waste bituminous product, Advantageously, the recycling plant according to the present invention further comprises: a mixing tank located below the exit of the recycling unit having a predetermined volume, and comprising at least a first horizontal screw with mixing blades, provided to agitate a bitumen product contained in said mixing tank.

In a preferred variant of the recycling plant according to the present invention, said mixing tank is provided with a first zone and a second zone, said first zone being above said second zone, said second zone being a bottom zone, said mixing tank having a second horizontal screw with conveying baffles inside said bottom zone, said at least first horizontal screw with blades being provided inside said first zone, said second horizontal screw with conveying baffles being provided to empty residues and bitumen product accumulated and having sedimented in said bottom zone while said at least first horizontal screw with mixing blades being provided to agitate said bituminous product located in the first zone, each first zone and second zone being provided with an exit equipped with a valve, eventually connected to a pump.

Preferably, in another variant, the recycling plant also comprises at least a bag filter, connected to the exit of the first zone of the mixing tank.

Other embodiments of the recycling plant according to the present invention are mentioned in the appended claims.

The present invention also relates to a Fluxed recycled bitumen having a predefined viscosity for pumpability comprised between 500 and 45000 cPS as measured by a parallel plate rheometer at 180° C., said recycled bitumen containing an organic phase at a content comprised between 70 and 99.5 w %, preferably between 80 and 99 w %, preferably between 85 and 95 w %, preferably between 90 and 95% with the respect to the weight of recycled bitumen and inorganic residues such as fiber, filler, flake, slate and the like, at a content comprised between 0.5 and 30 w %, preferably between 1 and 20 w %, preferably between 2 and 15 w %, preferably between 5 and 10 w % with respect to the weight of the recycled bitumen measured by the residues weight content upon calcination at 800° C., the organic phase content being determined by calculation of the difference with respect to 100 w %, said recycled bitumen further showing a ash residue comprised between 1 and 40 w %, preferably between 5 and 38 w %, preferably between 7 and 35 w %, preferably between 9 and 32 w %, preferably between 11 and 29 w % with respect to the weight of the recycled bitumen upon calcination at 800° C., said inorganic residues having a particle size distribution with 95% of the particles having a size less than or equal to 1 mm.

Within the meaning of the present invention, the term "viscosity" means the viscosity has been measured at 180° C. by a parallel plate rheometer (Anton Paar-Physica MCR101) comprising two parallels discs, one of which rotates. The parallel discs have a diameter of 10 mm and a gap between the discs is 1.3 mm at a rotation speed higher than sweeping the shear rate from 1 to 60 s-1.

In a preferred embodiment, the fluxed recycled bitumen presents a 25° C. penetrability comprised between 0.2 cm and 0.4 cm as a mean value between the internal face and superior face in a molded sample. The penetrability has been measured by a penetrometer PNR12 according to the standard ASTM D5 (version dating 2006) for measuring the distance in mm that a standard needle vertically penetrates a sample of the material under know conditions of loading, time and temperature. The weight of the needle and the load is 100 g and the duration time of the penetration test is 5 seconds at a temperature of 25° C. and 60° C. The measures were done 5 times and the two extreme values are removed while a mean is calculated for the 3 remaining measures. The sample was poured in a mold of 5 cm*5 cm*5 cm and the thickness of the sample should be at least 3.5 cm.

Advantageously, the fluxed recycled bitumen presents a softening point between 45/65 and 55/80 as measured by the bead anneal test according to the following method. More particularly, the recycled bitumen according to the present invention has a fiber content between 2 and 12% as measured by the bead anneal test.

Within the meaning of the present invention, the term "density" means the density has been measured in and out of $H_2O$ for a penetration cube (5*5*5 cm) sample by a scale L420P.

Other embodiments of the recycled bituminous product according to the present invention are mentioned in the appended claims.

The present invention also relates to a recycled bituminous phase containing the fluxed recycled bitumen according to the present invention at a content comprised between 10 and 100 w % with respect to the weight of the recycled bituminous phase, a fresh bitumen compound at a content comprised between 0 and 90 w % with respect to the weight of the recycled bituminous phase, additives at a content comprised between 0 and 5 w % with respect to the weight of the recycled bituminous phase such as polymer, plasticizer, and the like.

The present invention also relates to bituminous membrane containing a bitumen phase and a reinforcement layer, said bitumen phase containing a fluxed recycled bitumen according to the present invention at a content comprised between 4 and 90 w %, preferably between 10 and 85 w % with respect to the weight of said bitumen phase, a fresh bitumen compound at a content comprised between 0 and 90 w % with respect to the weight of said bitumen phase, additives at a content comprised between 0 and 50 w % with respect to the weight of said bitumen phase and a fresh polymer content comprised between 5 and 30 w %, preferably between 10 and 25 w % with respect to the weight of said bitumen phase, said recycled bitumen and fresh bitumen forming together a total bitumen content comprised between 30 and 95 w % with respect to the weight of said bitumen phase.

In a preferred embodiment, the bituminous membrane according to the present invention, further comprising at least one finishing layer such as a mineral layer, an adhesive layer, a polymer film layer and their combination.

The present invention also relates to the use of use of a fluxed recycled bitumen according to the aforementioned for an indoor or outdoor bituminous product, such as for flooring applications, roofing application, wall application or road application.

In the drawings, FIG. 1 represents a schematic flowchart view of the process according to the present invention.

Figure 1:
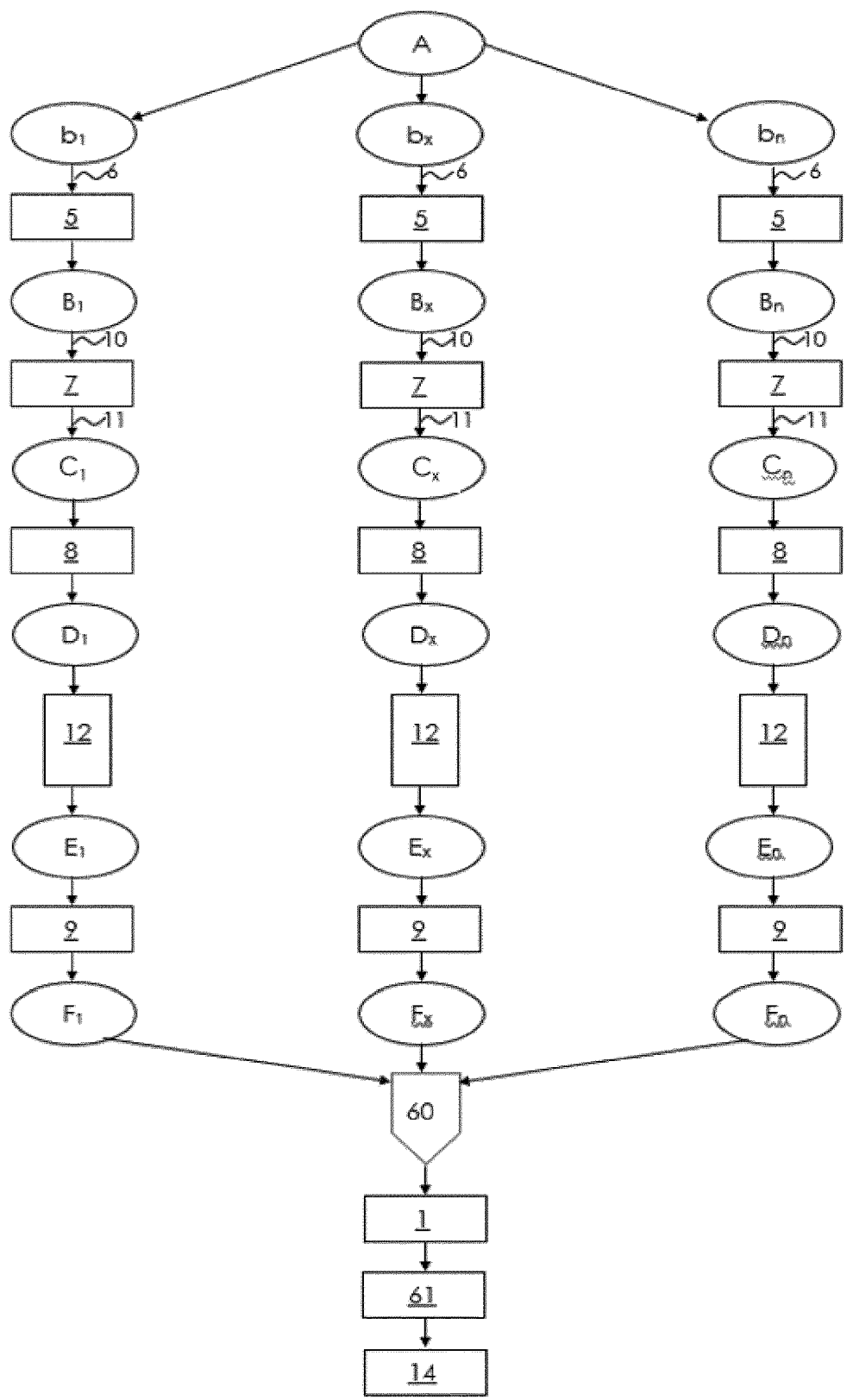

In the drawings, the same reference numbers have been allocated to the same or analog element As it can be seen in FIG. 1, the process comprises a first step of collecting waste bituminous products preferably waste bituminous products preferably waste bituminous membrane products containing bituminous layers and optionally reinforcement layers (A). The collected waste bituminous used in this example contains only APP-modified bitumen waste product and can contain a) pure production waste bituminous products and/or b) cutting waste bituminous products and/or c) aged and/or degraded roofing membranes.

The waste bituminous product collected is then sorted in n batch(es) for example batch ($b_1$), batch ($b_x$) and batch ($b_n$). Each batch will be treated in the plant separately even if, in some cases, it is possible to treat together waste product which are close to each other. Further in some cases, samples will be analyzed to determine the nature and the number of batch(es) ($b_1$, $b_x$, $b_n$) into which the collected waste bituminous product will be sorted.

The result of the sorting step and optionally the analysis step is a series of n batch(es) of waste bituminous products ($b_1$, $b_x$, $b_n$).

The batch(es) can therefore have different composition (chemical composition, age, level of contamination) with respect to each other or not depending on the nature of the collected waste bituminous product.

Also, sometimes, the collected waste bituminous products, preferably the collected waste bituminous products A will be inspected and will be considered enough homogeneous to be sorted in a single batch $b_1$.

Each batch to recycle will be subjected to a first grinding step in a knife shedder where a size reduction to a mean particle size distribution (d50) comprised between 20 and 50 cm to form a first shredded batch B. Accordingly, based on n batch(es) to be recycled ($b_1$, ..., $b_x$, ..., $b_n$) will form intermediately n first shredded batch(es) ($B_1$, bo; $B_x$, ..., $B_n$). The n first shredded batch(es) ($B_1$, ..., $B_x$, ..., $B_n$) will be conveyed by a conveying means 10 to a second grinding step. Each n first shredded batch(es) ($B_1$, ..., $B_x$, ..., $B_n$) will be reduced in size to a n first crushed batch(es) ($C_1$, ..., $C_x$, ..., $C_n$) where the particles have a mean particle size distribution between 5 and 25 cm, preferably between 8 and 20 cm.

The n first crushed batch(es) (($C_1$, ..., $C_x$, ..., $C_n$) will be conveyed by a conveying means 11 to a third grinding step. Each n first crushed batch(es) ($C_1$, ..., $C_x$, ..., $C_n$) will be reduced in size into a first grand batch ($D_1$, ..., $D_x$, D, $D_a$) where the mean particle size distribution is between 20 and 50 mm, typically between 25 and 40 mm and more particularly between 27 and 35 mm.

Each first ground batch ($D_1$, ..., $D_x$, ..., $D_n$) is then conveyed on a vibrating sieve 12 independently where dust and particles having a d100 lower than 8 mm, preferably lower than 7 mm, more preferably lower than 6 mm will be removed. n second ground batch(es) ($E_1$, ..., $E_x$, ..., $E_n$) are therefore obtained respectively from the n first ground batch(es) ($D_1$, ..., $D_x$, ..., $D_n$). Each n second ground batch(es) ($E_1$, ..., $E_x$, ..., $E_n$) is then passed through a Foucault cage where Foucault current is applied to remove the metallic elements from each second batch(es) (($E_1$, ..., $E_x$, ..., $E_n$). Preferably, the ferrous metal contaminants (Fe, Ni, Cu, ... ) are attracted and collected on one side while the non-ferrous metal contaminants (Al, Mg) are repulsed and collected on another side. The remaining particles form the third ground batch ($F_1$, ..., $F_x$, ..., $F_n$) which is the second ground batch depleted from metal contamination. Each third ground batch ($F_1$, ..., $F_x$, ..., $F_n$) is then stored in a storage tank or silo 60. Preferably the mixture stored in the storage tank or silo is analyzed (before or after being placed in the silo) in order to collect data pertaining to the chemical composition of the bitumen, the physical properties but also level of polymer contained.

Based on the analysis and based on the features expected from the recycled product, the operator, will then withdraw from silo's predetermined amount and prepare in a mixer 61 a mixture of several third ground batch(es) chosen amongst ($B_1$, ..., $B_x$, ..., $B_n$) to be introduced and fed into the recycling unit 1. A melted product will be collected at the end of the recycling unit in a vessel 14.

The batch(es) are mixed together based on predetermined ratio before being stored as a mixture of predetermined ratio of third ground batch(es) in a silo's or a storage tank 61 in order to feed the recycling unit 1 and obtain the recycled product in melted form in vessel 14.

The choice of the mixture to be performed can be dictated based on many criteria depending on:
ultimate use of the recycled product
level and nature of bitumen
level and nature of polymer
level and nature of contaminants
level of recycled product in final product, . . . .

Figure 2:
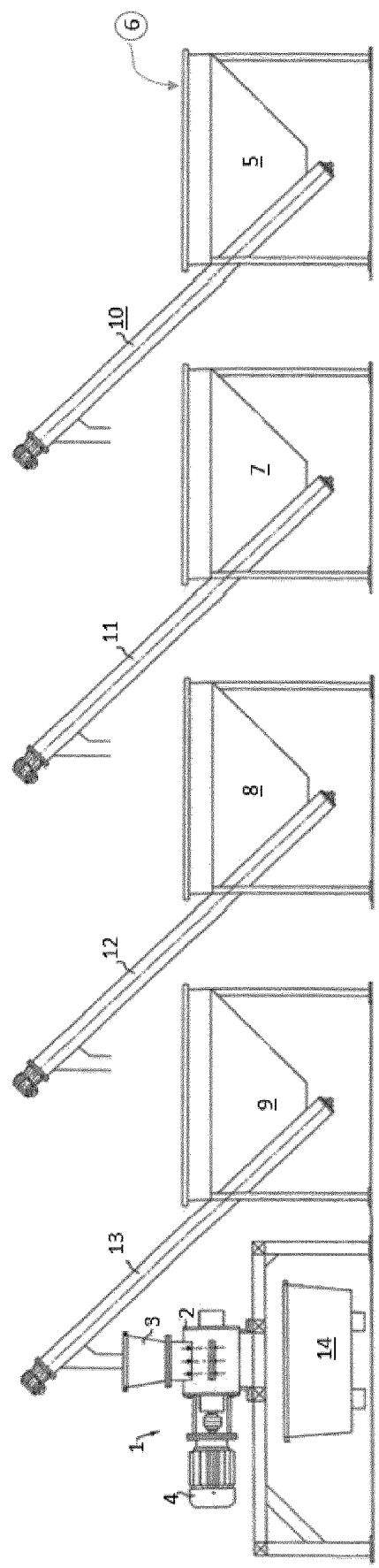
FIG. 2 is a recycling plant according to the present invention.

As it can be seen in FIG. 2, the recycling plant is shown schematically for recycling one waste bituminous product batch, optionally a waste bituminous membrane product containing reinforcement material comprises at least one recycling unit 1 comprising a housing 2' and a feeding means 3. The housing encloses a first stator and a first rotor driven by a motor 4. The recycling plant comprises further a first grinding means 5, such as a knife shredder provided for grinding each first batch of waste bituminous product batch 6 in a first shredded batch having a mean particle size distribution comprised between 20 and 50 cm, preferably between 20 and 40 cm. The first grinding means 5 have a first inlet for receiving the waste bituminous products 6 and a first exit for exiting the first shredded batch.

The recycling plant also comprises a second grinding means 7 such as a rotor granulator, which is, in this shown embodiment, while not being limited thereto, fed by said first shredded batch. The second grinding means 7 is provided for grinding said first shredded batch in a first crushed batch having a mean particle size distribution between 5 and 25 cm, preferably between 8 and 20 cm. The second grinding means 7 has a second inlet for accommodating the first shredded batch and a second exit for exiting the first crushed batch. The second inlet of the second grinding means is connected to the first exit of the first grinding means 5 at least by conveying means 10.

By the terms "connected", it is meant according to the present invention that the flow of matter follows the pathway from an element A to an element B, being the same or different than A, which is connected directly or indirectly to the element A, with physical means of simply flowing from element A to element B, even if passing inside another equipment in between as additional element can be introduced between element A and B.

The recycling plant further comprises a third grinding means 8, such as a rotor granulator, provided for grinding said first crushed batch in a first ground batch having a mean particle size distribution between 20 and 50 mm, preferably between 25 and 40 mm, more preferably between 27 and 35 mm. The third grinding means 8 has a third inlet and a third exit. The third inlet is connected to the second exit of the second grinding means at least by conveying means 11.

The plant according to the present invention is also provided with a vibrating sieve 12 provided to convey and sieve the first ground batch originating from the third grinding means 8 and to provide a second ground batch, being the first ground batch substantially depleted from dust and particles having a particle size $d_{100}$ lower than 8 mm, preferably lower than 7 mm and more. The vibrating sieve 12 conveys the second ground batch to a separator 9 provided for separating metal pieces from non-metal pieces by application of Foucault current to said second ground batch and for producing a fine ground batch, being said second ground batch substantially depleted from metal pieces.

The third ground batch is further conveyed by means of a conveying means 13 to the feeding means 3 of the recycling unit 1.

In this shown embodiment, a vessel 14 for collecting the recycled bituminous product is provided below the recycling unit 1 where an exit is foreseen.

Figure 3:
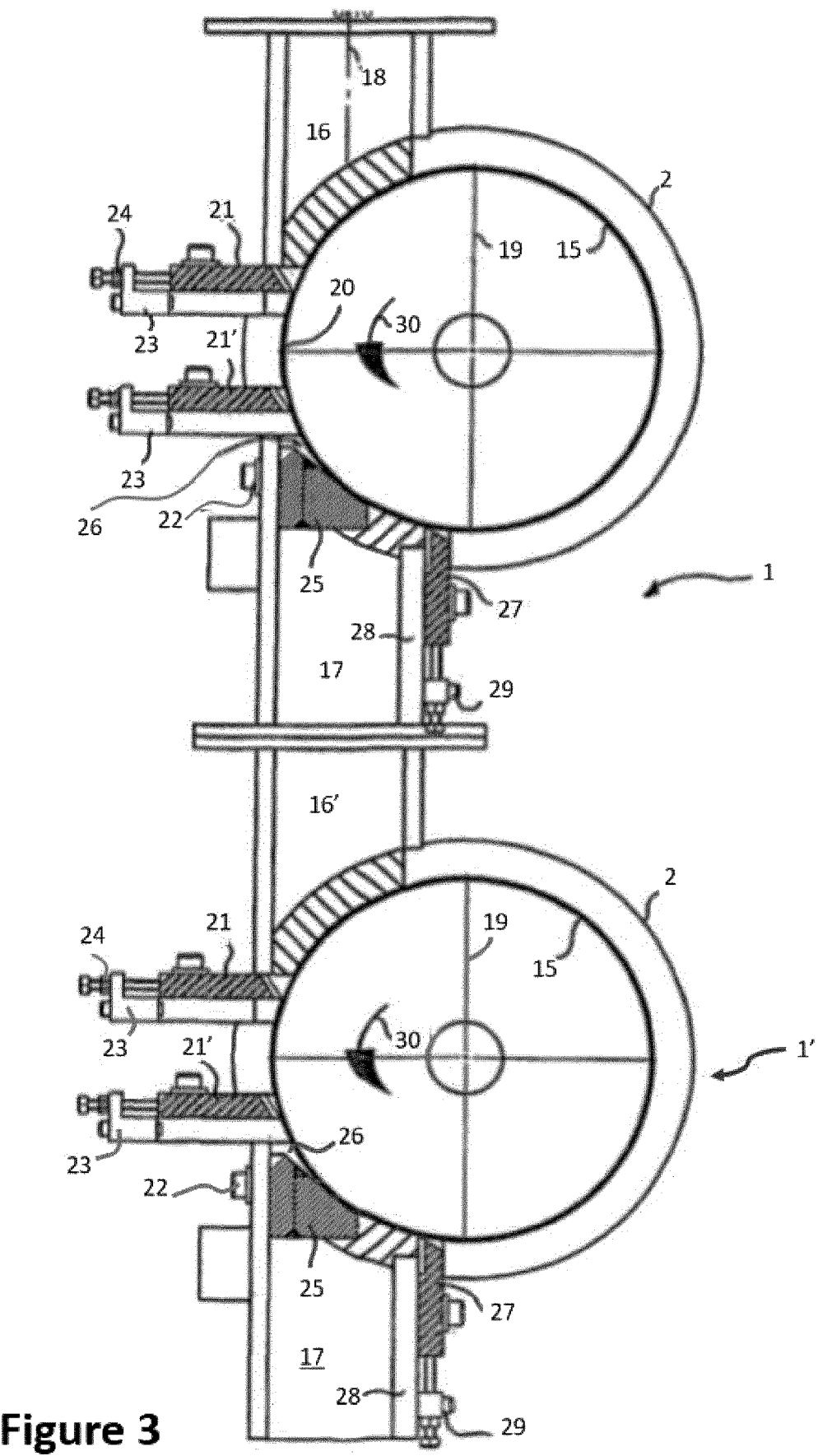
FIG. 3 represents a schematic view of a recycling unit having a first and a second rotor/stator assembly.

In FIG. 3, a detail in cross section of a first embodiment according to the present invention is shown where two recycling units 1, 1' are present. As it can be seen in FIG. 1, each recycling unit 1, 1' comprises comprising a first rotor 15 housed in a first stator 2. The stator 2 has a substantially cylindrical geometry that facilitates its manufacture. The input 16 and the output 17 are situated along the same vertical axis 18 which is offset with respect to the central vertical axis 19 of the rotor 15. This offset has the effect of creating, by the rotation of the rotor 15, a suction effect on the pieces of the third ground batch introduced into the input 16. It is also possible to offset the input 16 and the output 17 with respect to one another within the scope of the present invention. The stator 2 is provided with a chamber 20 delimited by an external wall of the first rotor 15. The chamber 20 is a micronization chamber 20 formed by a recess arranged between two counter-elements 21, 21' mounted on the stator 2 which is substantially cylindrical and comprises an adjustment means 24 organized to adjust the volume and/or shape of the chamber. A good compromise shall be found between a good level of grinding of the fibers and an acceptable flowrate. If the distance between the rotor and the counter-element 21, 21' is too low, the recycled product present a too small particle size of the fibers spread in the melted product (i.e. from reinforcement layer if present) and the flowrate of the recycling unit is too low. If the distance between the rotor and the counter-element 21, 21' is too high, the recycled product contain long fibers but present a high flowrate in the exit.

The micronization chamber 20 allows the mass of the third ground batch introduced into the input opening 16 to accumulate there temporarily. Since the chamber 20 is delimited by the external wall of the rotor 15, the bituminous mass, which is situated in this chamber, will be driven rotationally by the rotation of the rotor 15 and thus swirl around in the chamber 20. Thus, the introduced cold third ground batch will heat up more quickly and will be triturated more easily. This is because the centrifugal force imposed on the mass by the rotor 15 will make it heat up more quickly.

The mass thus presents in the chamber 20 will be mixed and/or ground in order to melt it. When the recycling unit 1 is equipped with heating means, the latter contribute towards heating said mass. The passage 22 that extends between the input opening 16 and the micronization chamber 20 is chosen to be sufficiently wide so as to facilitate access to the micronization chamber 20.

The micronization chamber 20 is mounted in an adjustable and removable manner in the stator 2. To that end, the micronization chamber 20 is mounted between two supports 23, each being provided with an adjustment means 24, for example formed by a screw and a bolt. The adjustment means 24 allow not only mounting and removal of the chamber, but also make it possible to vary of the size of the chamber by moving it nearer or further away with respect to the external wall of the rotor 15.

One end of the counter-element 21, situated downstream of the chamber 20, forms the tip of the blade of a knife which is used to shear the pieces of the third ground batch triturated in the chamber 20 more and to disintegrate the reinforcement if present in the pieces. The blade of the knife is also used to shear and pulverize the mineral covering provided on the surface of the bituminous membrane.

A deflector 25 is mounted downstream of the micronization chamber. The deflector 25 is mounted on the stator 2 and disposed in the output opening 21, along part of the external wall of the rotor 11. The deflector 25 is preferably trapezoidal in shape and delimits a first cavity 26, formed between the lower part of the support 23, the upper part of the deflector 25, the stator 2 and the rotor 15. Thus, the bituminous mass that has passed through the chamber 20 can accumulate temporarily in this first cavity 26 which thus forms a buffer. From this buffer, the melted mass will then be conveyed by the deflector 25 along the rotor 15 and will lubricate the latter.

A scraper 27 is mounted downstream of the deflector 25 also in the output opening 21. The scraper 27 and the deflector 25 are disposed so as to be at a distance from each other on opposite sides of the output opening 17. Thus, a corridor is created between the deflector 25 and the scraper 27 through which the processed material can reach the output opening 17. The scraper 27 is mounted on a support 28, using adjustment means 29. The scraper 27 is used to scrape the external wall of the rotor 15 so as to scrape the bituminous material which accumulates on this wall. Preferably the scraper 27 extends over at least part of the length of the rotor 15.

In this illustrated embodiment, two recycling unit 1 are comprised where the first and second stators 2 and rotors 15 preferably have a substantially identical construction and are placed in series so that the second recycling unit 1' is downstream of the first recycling unit 1. Thus an output 17 of the first recycling unit 1 opens into an input 16 of the second recycling unit 1'. To facilitate understanding, the identical elements of the second member have been indicated using the same reference as that used for the first.

To recycle the bituminous product or membrane pieces, the third ground batch is introduced into the input opening 16 of the first recycling unit 1. The rotation, indicated by the arrow 30, of the rotor 15 and the offset of the opening 16 with respect to the central axis 19 cause the suction towards the rotor 15 of the introduced third ground batch. This will at first accumulate in the opening on the external wall of the rotor which passes through the opening during its rotation.

The mass can heat up more quickly if the stator 2 and rotor 15 are heated using a heating body. The heated third ground batch will then, by the rotation of the rotor 15, be driven towards the micronization chamber 20 and if applicable towards the first knife blade 21.

Preferably, the counter-element 21 and/or the stator 2 are treated with a wear-resistant substance, in particular tungsten carbide.

After having passed the knife blades 21, the hot mass will temporarily accumulate in the cavity 26 in order to heat up more and reach its melting point in order to be next conveyed along the external wall of the rotor 15. The hot mass thus lubricates the rotor 15. Next, the mass reaches the corridor between the deflector 25 and the scraper 27 in order to fall into the output opening 17 under the effect of gravity. The scraper 27 takes care of scraping the external wall of the rotor, so as to prevent the mass, which is sticky because of the presence of hot bitumen, accumulating on the rotor 15 and thus preventing its rotation. The distance between the scraper 27 and the external wall of the rotor is chosen so that a little bituminous mass remains on the rotor 15 and lubricates its movement.

In this illustrated embodiment, the central vertical axis 19 of the rotor 15 of the first recycling unit 1 is aligned with the central vertical axis 19 of the rotor 15 of the second recycling unit 1'.

Figure 4:
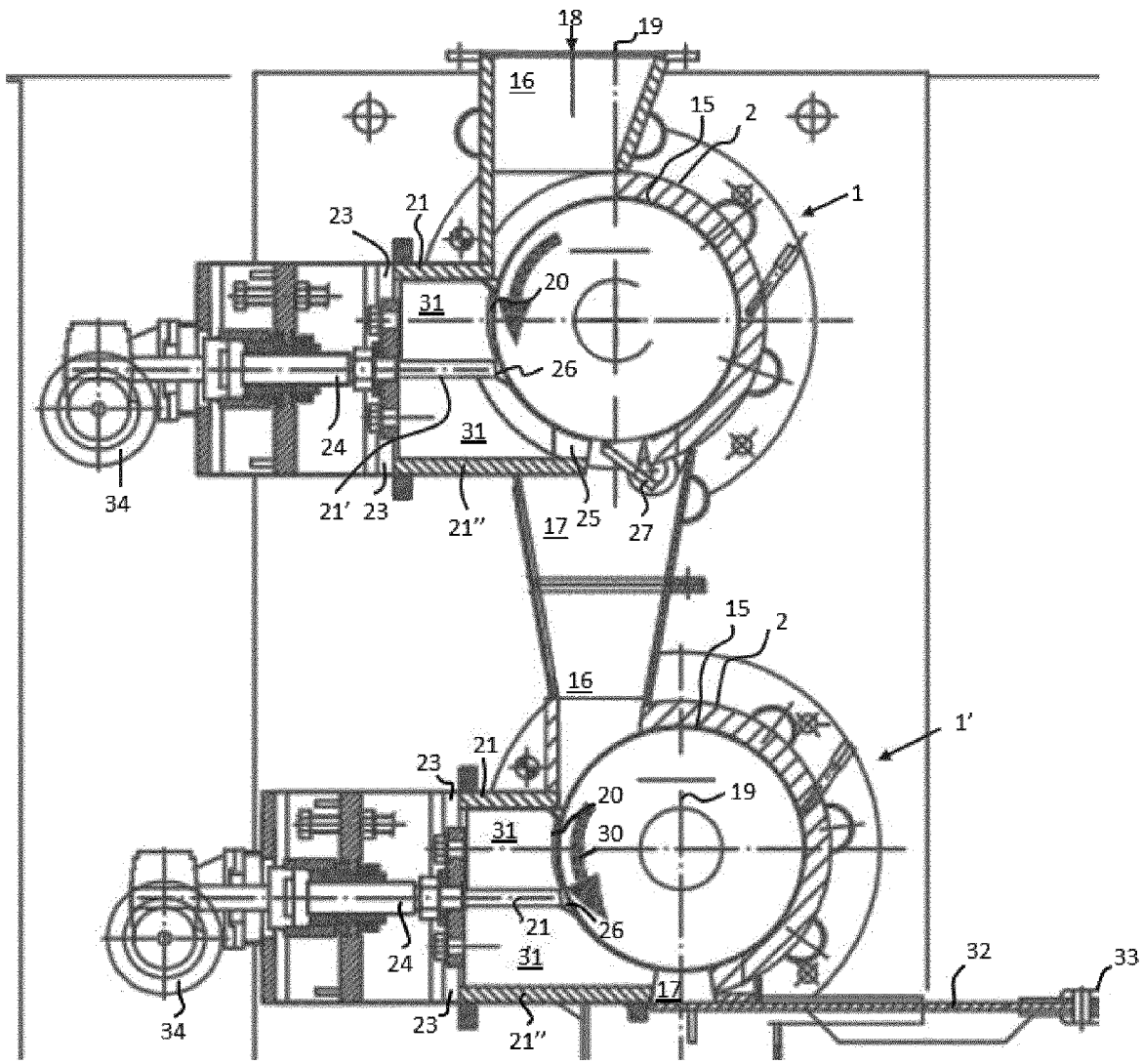
FIG. 4 represents a partial cross section of a recycling unit having a first and a second rotor/stator assembly along the line 7-7 of FIG. 5.

In a preferred embodiment illustrated in FIG. 4, the central vertical axis 19 of the rotor 15 of the first recycling unit 1 is offset with the central vertical axis 19 of the rotor 15 of the second recycling unit 1'.

As it can be seen in FIG. 4, each recycling unit 1, 1' comprises the same elements as illustrated for the embodiment in FIG. 1. The stator 2 is provided with a chamber 20 delimited by an external wall of the first rotor 15. The chamber 20 is a micronization chamber 20 formed by a recess arranged in a cleat block 31 between two counter-elements 21, 21' mounted on the stator 2. A second micronization chamber or cavity 26 is provided delimited by an external wall of the first rotor 15. The cavity 26 is formed in a recess arranged in a cleat block 31 between two counter elements 21' and 21". The two cleat block are made solidary one to each other and connected to a support element 23 comprising adjustment means 24 organized to adjust the volume and/or shape of the chamber. The adjustment means 24 can be operated manually with a wheel 34 (handwheel) or motorized wheel 34. The counter elements 21, 21' and 21" are a structural portion of the recycling plant and guide the cleat blocks 31 an 31' when going forward or backward for adjustment.

The micronization chamber 20 allows the mass of the third ground batch introduced into the input opening 16 to accumulate there temporarily. Since the chamber 20 is delimited by the external wall of the rotor 15, the bituminous mass, which is situated in this chamber, will be driven rotationally by the rotation of the rotor 15 and thus swirl around in the chamber 20.

A sliding trapdoor 32 can be manually driven by a motor 33.

Figure 5:
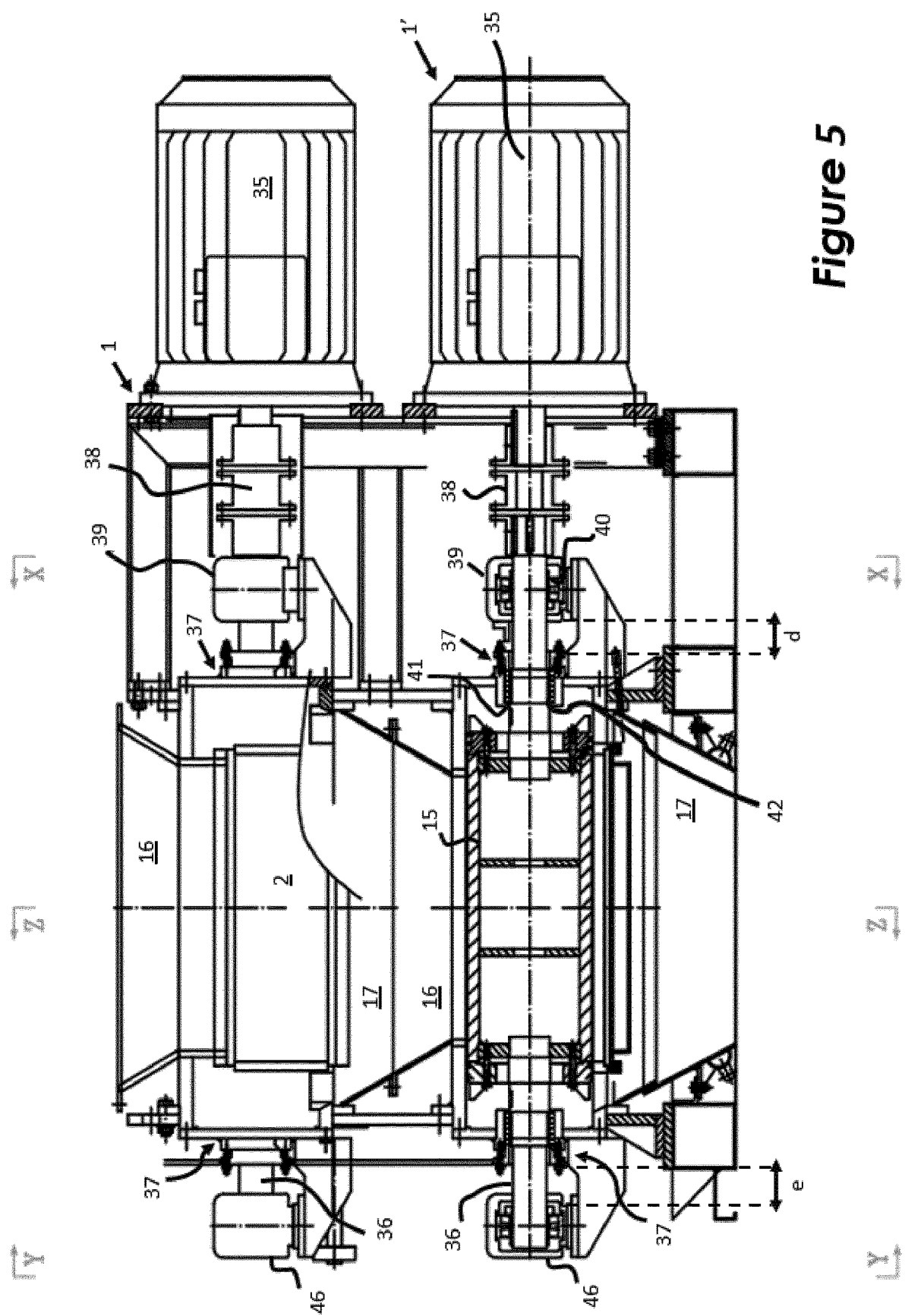
FIG. 5 represent a cross section along the vertical axis 19 of the rotor of the second recycling unit 1' illustrated in FIG. 2.

As it can be seen in FIG. 5, the rotor 15 is operated by a motor 35 driving a rotation axis 36 connected by a tight connection 37 to the rotor 15. The motor 35 is coupled to the rotation axis 36 by a coupling element 38. The rotation axis 36 further passes through a roller bearing block 39 disposed between the tight connection 37 and the coupling element 38. The tight connection 37 and the roller bearing block 39 are separated by a distance d comprised between 6 and 20 cm, preferably between 7.5 and 15 cm.

It has been indeed realized according to the present invention that, contrarily to what is generally applied in mechanical engineering that providing a significant space between the tight connection 37 and the roller bearing block 39 allow to increase the efficiently of the recycling plant according to the present invention, by reducing the off period and thereby increasing drastically the operating life of the plant between two maintenance.

The rotor 15 is on one end connect to a motor 35 driving a rotation axis 36 and on the other end connected to a dead end of said rotation axis 36 by a tight connection 37 to the rotor 15. The rotation axis dead end passing through a roller bearing block 46, on the opposite side of the recycling unit 1, 1' with respect to the side connected to the motor 35. The roller bearing block 46 is disposed between the tight connection 37 and an end of the rotation axis 36. The tight connection 37 and the roller bearing block 39 are separated by a distance e comprised between 6 and 20 cm, preferably between 7.5 and 15 cm.

The space of a distance d or the space of a distance e allows said melted product overflowing along the driving axis (rotation axis) 36 to be collected in a vessel by flowing through the space provided between the stator and the coupling element provided to couple the rotor of the recycling unit and a motor or on the opposite side between the stator 2 and the end of the driving axis (rotation axis) 36.

Figure 6:
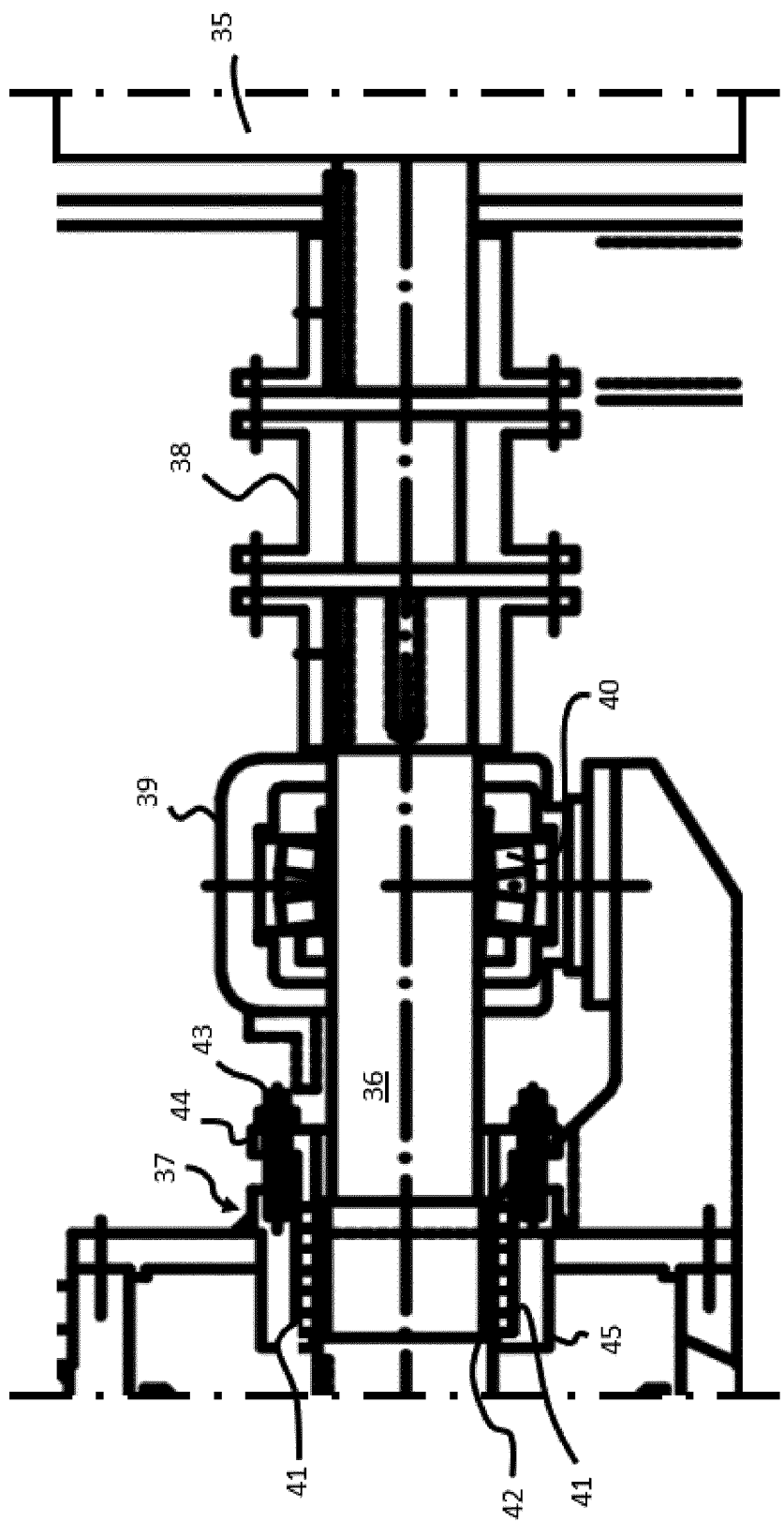
FIG. 6 is an enlarged view of the rotation axis between the rotor and the motor.

As it can be seen in FIG. 6, the space of a distance d provided between the tight connection 37 and the roller bearing block 39 allows hot bitumen overflowing from the rotor 15 along the rotation axis 36 to flow downwards, and hereby prevent the roller bearing 40 getting dirt and contaminated by recycled bitumen, which latter would be very detrimental to its lifetime.

As it can be seen also in FIG. 6, The tight connection 37 comprises an O-ring cord 41 surrounding a metal ring 42 located around said rotation axis 36 and extending over a length of said rotation axis 36 defined between 2 flanges 44, 45.

In a further preferred embodiment, in said tight connections, at least one the 2 flanges 44, 45 comprises one mobile flange 44 which can move along a direction parallel to the rotation axis 36 in order to reduce or to increase the distance between said 2 flanges 44, 45, for example with a tightening clamp 43.

As it can be seen in FIG. 7, a mixing tank 14 is located below the recycling units 1, 1'. The mixing tank 14 located below the exit 17 of the recycling unit 1' has a predetermined volume, and comprise at least a first horizontal screw 47 with mixing blades 48, provided to agitate a bitumen product contained in said mixing tank 14. The mixing tank comprises heating means to provide a residence temperature comprised between 160 and 200° C., preferably between 170 and 190° C., more preferably around 180° C.

Figure 7:
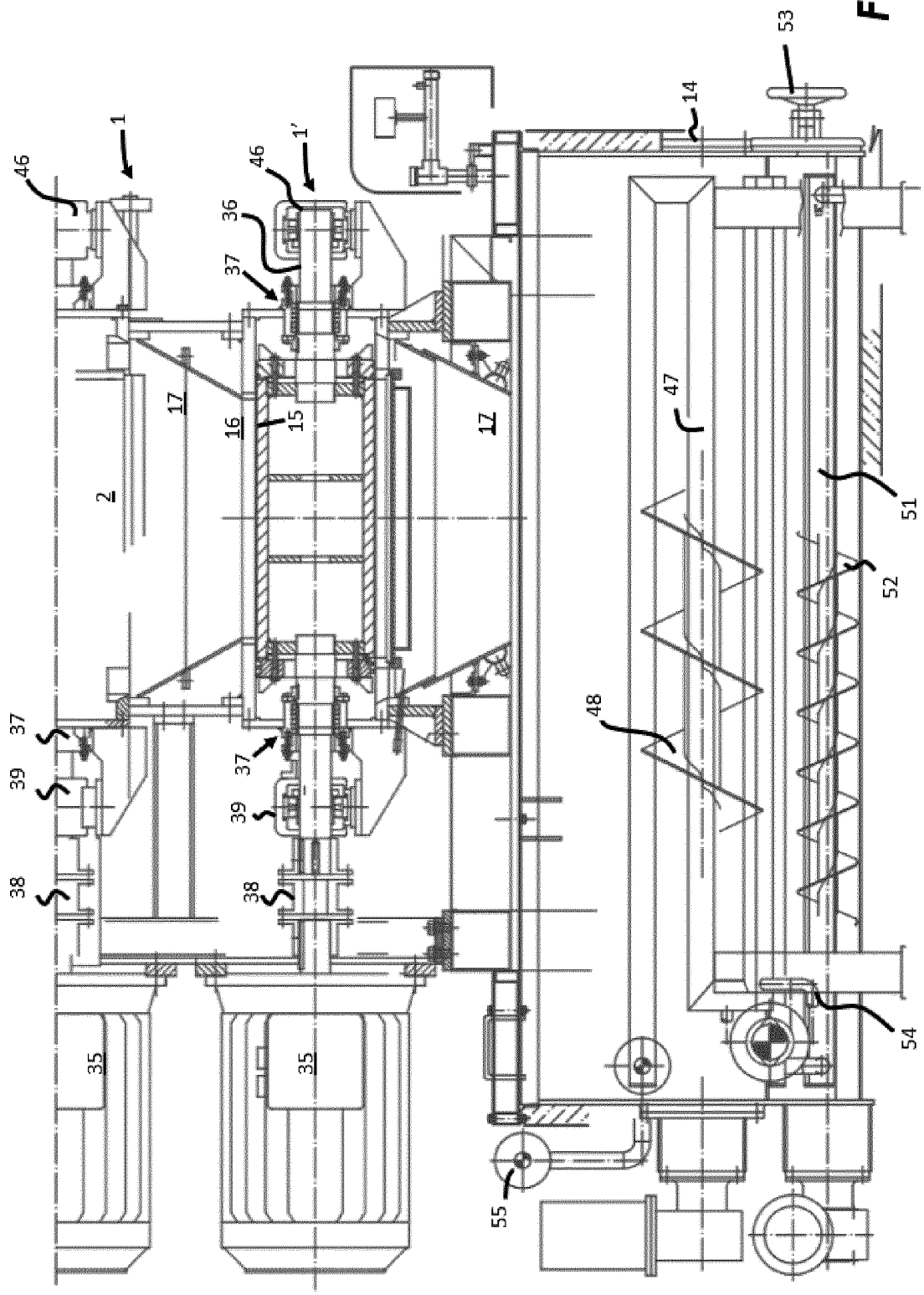
FIG. 7 is a partial cross-section of a recycling plan according to the present invention showing details of the mixing tank.
Figure 8:
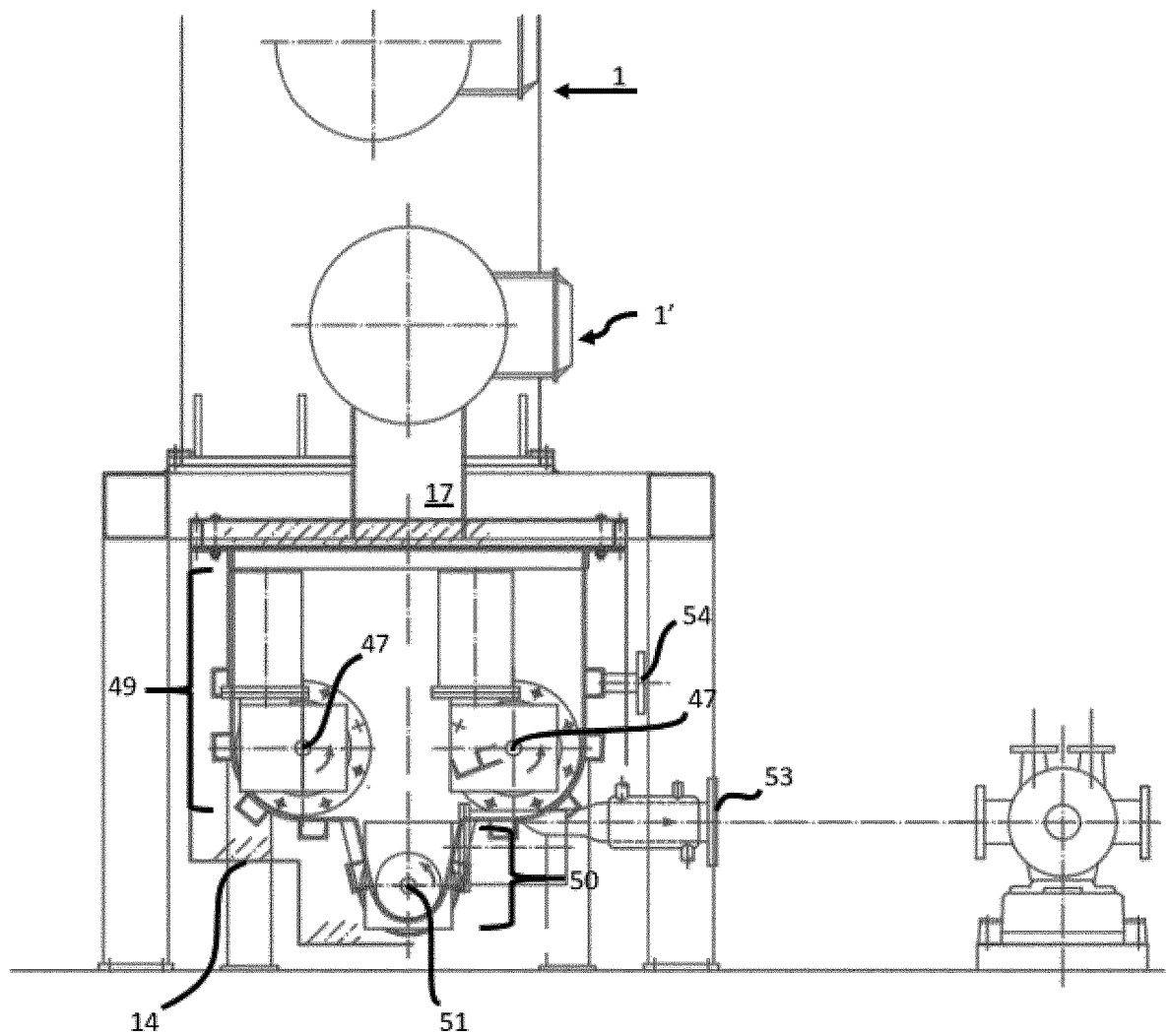
FIG. 8 is a cross section of the mixing tank located below the recycling units.
Figure 9:
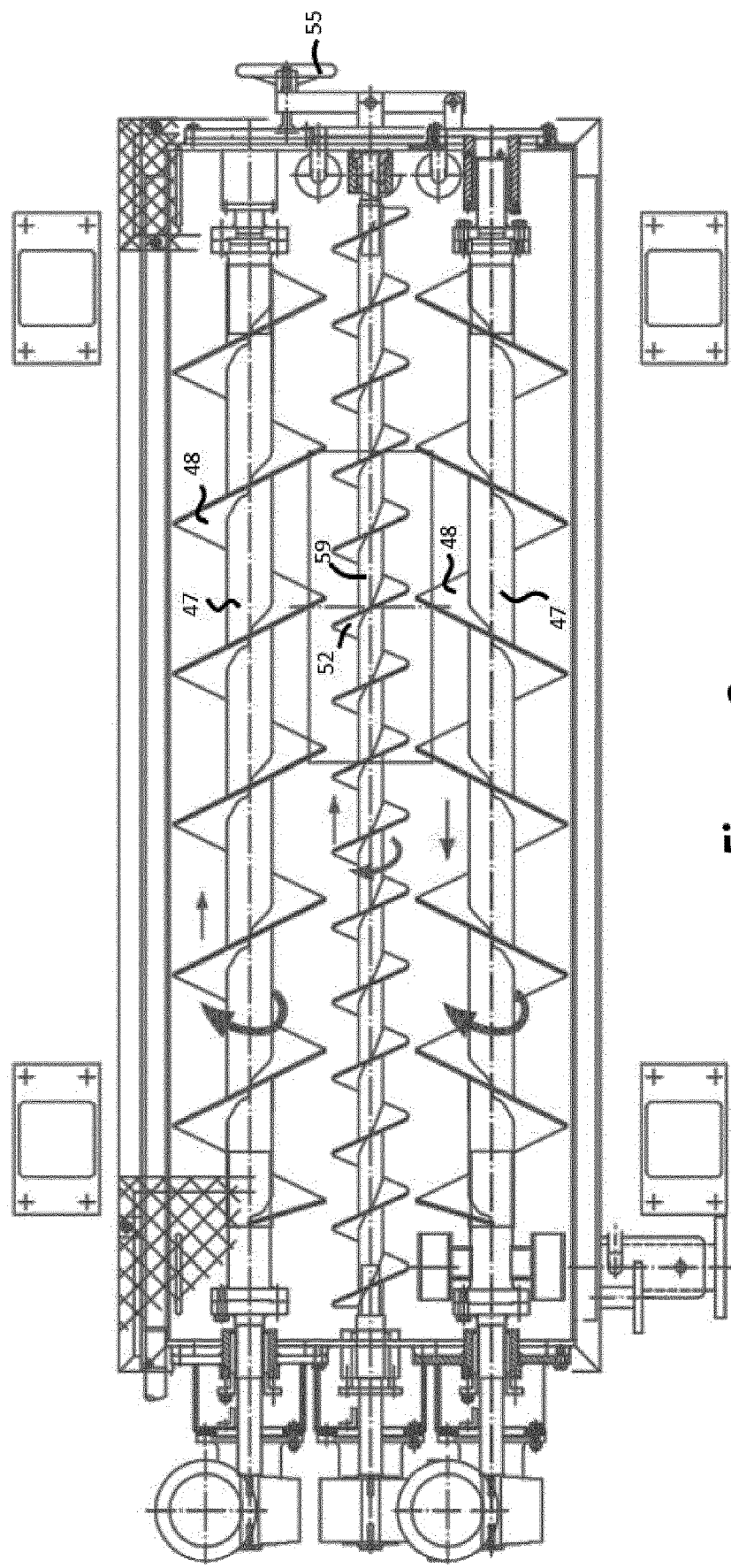
FIG. 9 is a view from above of the mixing tank located below the recycling units.

As it will be more apparent from FIGS. 7 and 8, the mixing tank 14 is provided with a first zone 49 and a second zone 50. The first zone 49 is located above said second zone 50, being a bottom zone 50. A second horizontal screw 51 with conveying baffles 52 inside said bottom zone 50. The at least first horizontal screw 47 with mixing blades 48 is provided inside said first zone and the number of first horizontal screw can be higher than 1, depending on the size of the horizontal section of the first zone 49. In this preferred illustrated embodiment, the number of horizontal screw 47 with mixing blades 48 is 2.

The second horizontal screw 51 acts as a conveying means with a baffles 52 and is provided to remove any waste product located in said bottom zone 50. The crank 53 allows to open a trapdoor on the side of the recycling unit. By rotating the screw 51, the waste products is evacuated from the mixing tank. This operation is performed after having discharged the mixing tank 14.

EXAMPLES

The following recycled bitumen have been obtained from the process according to the present invention.

Example 1

10 tons of APP waste bituminous membrane product was collected from the production facility. The collected waste product was sorted in one single batch. The batch was introduced in the plant according to the present invention and was therefore ground 3 times. The first grinding step allows to reduce the mean particle size distribution ($d_{50}$) to 300 mm; the second grinding step allows to reduce the mean particle size distribution ($d_{50}$) to 150 mm while the third grinding step allows to reduce the mean particle size distribution ($d_{50}$) to 30 mm forming bituminous flakes. The batch was melted in the recycling plant at a temperature of about 200° C. and form the collected melted material.

The recycled bitumen was collected in a mixing tank containing 50% of regular bitumen 70/100 as carrier with respect to the volume of the mixing tank. After another 50% of the volume of the mixing tank was filled in with the recycled bitumen, the final recycled bituminous product was obtained after continuous agitation during filling in.

The collected melted material showed the features presented in table 2.

TABLE 2

|  | Example 7 |
|---|---|
| Viscosity cPS | na |
| 25° C. Penetrability (cm) | 0.35 |
| TBA (° C.) | 49/70 |
| Density | 1.14 |
| Ash (%) | na |

Example 2

Example 1 was reproduced except that the particles were depleted in fine particles lower than 6 mm.

The collected melted material showed the features presented in table 3.

TABLE 3

|  | Example 8 |
|---|---|
| Viscosity cPS | na |
| 25° C. Penetrability (cm) | 0.36 |
| TBA (° C.) | 45/68 |
| Density | 1.13 |
| Ash (%) | na |

Example 3

Example 1 was reproduced except that the waste bituminous membrane product collected was mainly used and aged APP roofing membrane from demolition site. The collected material was sorted in a single batch.

The collected melted material showed the features presented in table 4.

TABLE 4

|  | Example 9 |
|---|---|
| Viscosity cPS | na |
| 25° C. Penetrability (cm) | 0.31 |
| TBA (° C.) | 55/75 |
| Density | 1.15 |
| Ash (%) | na |

Example 4

Example 3 was reproduced except that the particles were depleted in fine particles lower than 6 mm.

The collected melted material showed the features presented in table 5.

TABLE 5

|  | Example 9 |
|---|---|
| Viscosity cPS | na |
| 25° C. Penetrability (cm) | 0.26 |
| TBA (° C.) | 66/76 |
| Density | 1.13 |
| Ash (%) | na |

Example 5

10 tons of SBS waste bituminous membrane product was collected from the production facility. The collected waste product was sorted in one single batch. The batch was introduced in the plant according to the present invention and was therefore ground 3 times. The first grinding step allows to reduce the mean particle size distribution ($d_{50}$) to 300 mm; the second grinding step allows to reduce the mean particle size distribution ($d_{50}$) to 150 mm while the third grinding step allows to reduce the mean particle size distribution ($d_{50}$) to 30 mm forming bituminous flakes. The batch was melted in the recycling unit at a temperature of about 200° C. and form the collected melted material.

The collected melted material showed the features presented in table 6.

TABLE 6

|  | Example 5 |
|---|---|
| Viscosity cPS | 625 |
| 60° C. Penetrability (cm) | 0.37 |
| TBA (° C.) | 61/74 |
| Density | 1.11 |
| Ash (%) | 9.68 |

It should be understood that the present invention is not limited to the described embodiments and that variations can be applied without going outside of the scope of the appended claims.

The invention claimed is:

1. A process of recycling a bituminous product, or a bituminous membrane product containing reinforcement layers, the process comprising the steps of:
    collecting waste bituminous products, or waste bituminous membrane products containing bituminous layers and reinforcement layers and sorting the waste bituminous products in a series of n waste bituminous product batch(es);

at least one grinding step of each batch of said series of n waste bituminous product batch(es) or of a mixture of n waste bituminous product batch(es), thereby forming a fine ground batch;

introducing said fine ground batch into a recycling unit having at least a rotor and a stator and a micronization chamber, said fine ground batch being heated and melted by shear strength upon an operation of the stator, rotor and micronization chamber and collecting a melted product; and feeding said melted product in a mixing tank having a predetermined volume containing fresh carrier at a level comprised between 25 and 75w %, with respect to the predetermined volume, and at a residence temperature between 160 and 200° C., said mixing tank being continuously agitated with a horizontal screw having mixing blades, said melted product being fed in said mixing tank until a volume of the melted product is comprised between 25 and 75w %, with respect to the predetermined volume to provide a recycled bitumen at a temperature of 180° C. for pumpability and having a predefined viscosity between 500 and 45000 cPS, wherein said at least one grinding step comprises:

a first grinding of each batch of said series of n waste bituminous product batch(es) in a knife shredder for reducing a size of each batch into a first shredded batch having a mean particle size distribution between 20 and 50 cm;

a second grinding of each first shredded batch in a rotor granulator where each first shredded batch is reduced in size to a first crushed batch having a mean particle size distribution between 5 and 25 cm; and a third grinding of each first crushed batch in a rotor granulator where each first crushed batch is reduced in size to a first ground batch having a mean particle size distribution between 20 and 50 mm.

2. The process according to claim 1, wherein before being fed to said recycling unit, said fine ground batch is conveyed on a vibrating sieve to collect a fine ground batch substantially depleted from dust and particles having a particle size d100 lower than 8 mm.

3. The process according to claim 1, wherein, before being fed to said recycling unit, said fine ground batch undergoes a step of separating metal pieces from non-metal pieces by application of Foucault current to said fine ground batch and collecting a fine ground mixture substantially depleted from metal pieces.

4. The process according to claim 1, wherein the recycled bitumen is further withdrawn by pumping in batches and filtrated in a bag filter, before or after being stored in a storage tank.

5. The process according to claim 1, wherein said fine ground batch is melted at a temperature between 110° C. and 260° C.

* * * * *

UNITED STATES PATENT AND TRADEMARK OFFICE
CERTIFICATE OF CORRECTION

PATENT NO. : 12,214,362 B2
APPLICATION NO. : 17/776077
DATED : February 4, 2025
INVENTOR(S) : Guillaume Moreels et al.

It is certified that error appears in the above-identified patent and that said Letters Patent is hereby corrected as shown below:

In the Specification

Column 8
Line 33 — Delete "TABLE J" and insert --TABLE 1--
Table 1, Line 3 (1st occurrence) — Delete "no" and insert --n°--
Table 1, Line 3 (2nd occurrence) — Delete "no" and insert --n°--
Table 1, Line 3 (3rd occurrence) — Delete "no" and insert --n°--
Table 1, Line 3 (4th occurrence) — Delete "no" and insert --n°--
Table 1, Line 3 (5th occurrence) — Delete "no" and insert --n°--

Column 14
Line 67 — Delete "7-7" and insert --Z-Z--

Column 20
Line 18 — Delete "e" and insert --d--

Signed and Sealed this
Eighth Day of April, 2025

Coke Morgan Stewart
*Acting Director of the United States Patent and Trademark Office*